United States Patent
Fürll et al.

(10) Patent No.: US 10,093,146 B2
(45) Date of Patent: Oct. 9, 2018

(54) AIR-CONDITIONING SYSTEM FOR A VEHICLE AND METHOD FOR AIR-CONDITIONING A VEHICLE

(75) Inventors: Matthias Fürll, Weddel (DE); Stefan Schmitt, Velpke (DE); Horst Achim Schröter, Braunschweig (DE); Stefan Brück, Wolfsburg (DE); Gregor Homann, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 775 days.

(21) Appl. No.: 13/820,106

(22) PCT Filed: Aug. 31, 2011

(86) PCT No.: PCT/EP2011/004378
§ 371 (c)(1),
(2), (4) Date: Feb. 28, 2013

(87) PCT Pub. No.: WO2012/028307
PCT Pub. Date: Mar. 8, 2012

(65) Prior Publication Data
US 2013/0152611 A1 Jun. 20, 2013

(30) Foreign Application Priority Data

Sep. 4, 2010 (DE) .......... 10 2010 044 416
Jul. 30, 2011 (DE) .......... 10 2011 109 055

(51) Int. Cl.
*B60H 1/00* (2006.01)

(52) U.S. Cl.
CPC ..... *B60H 1/00007* (2013.01); *B60H 1/00921* (2013.01); *B60H 2001/00949* (2013.01)

(58) Field of Classification Search
CPC ............ B60H 1/00007; B60H 1/00921; B60H 2001/00949; B60H 1/00278; B60H 1/00885; B60H 2001/00307
(Continued)

(56) References Cited

U.S. PATENT DOCUMENTS 5,375,427 A * 12/1994 Hara .................. B60H 1/00007
62/159
6,584,785 B1 7/2003 Stefan
(Continued)

FOREIGN PATENT DOCUMENTS

CN 1176901 A 3/1998
CN 1611379 A 5/2005
(Continued)

OTHER PUBLICATIONS

International Search Report issued for PCT International Application No. PCT/EP2011/004378, dated Dec. 1, 2011.
(Continued)

*Primary Examiner* — Frantz Jules
*Assistant Examiner* — Steve Tanenbaum
(74) *Attorney, Agent, or Firm* — Pearl Cohen Zedek Latzer Baratz LLP

(57) ABSTRACT

An air-conditioning system for a vehicle, comprising a refrigerant circuit through which a refrigerant can flow and which is configured as a heat pump circuit and as a cooling system circuit, and associated with these, a compressor, at least one external heat exchanger, at least one internal heat exchanger that is associated with an internal heating condenser, whereby a device is provided for generating an air stream that can be thermally coupled to the internal heat exchanger and to the internal heating condenser, as well as a metering device that can meter the flow of at least a partial
(Continued)

Figure 1:
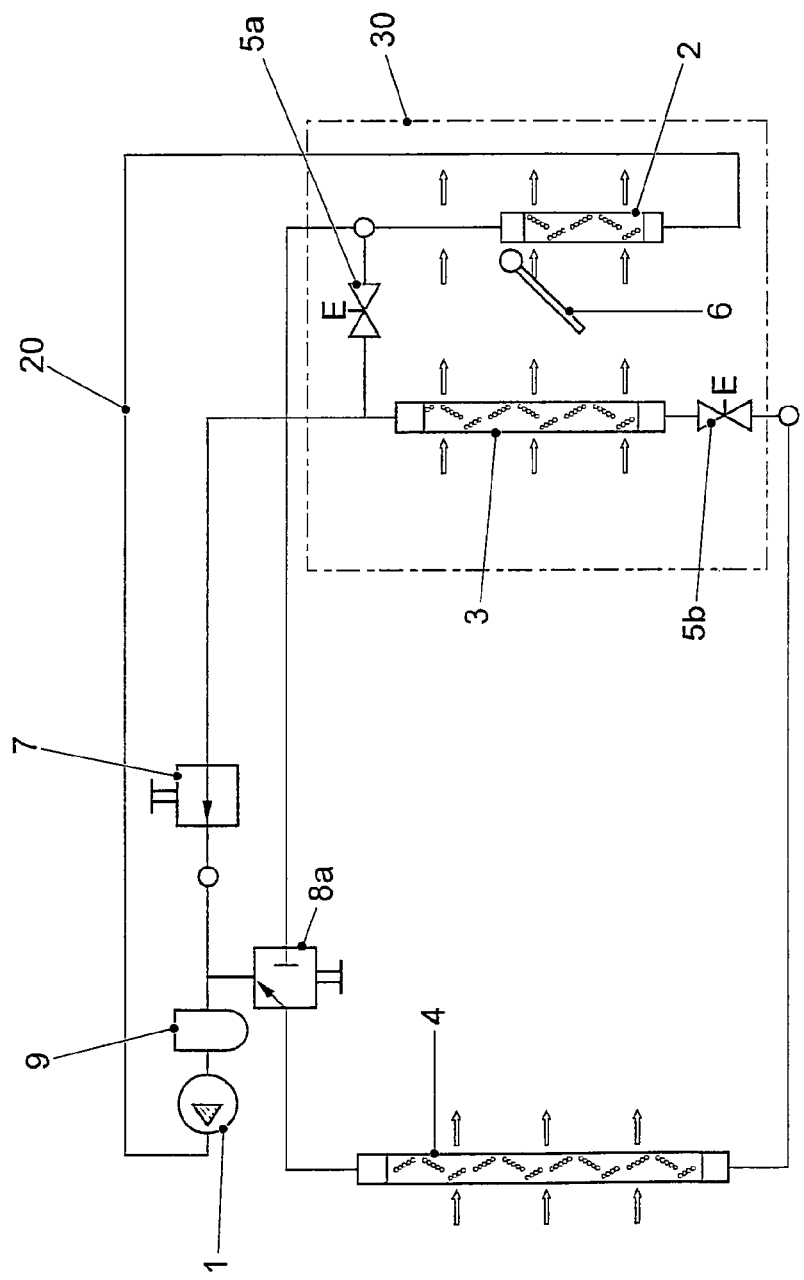

stream of the thermally coupled air stream through the internal heating condenser is provided, wherein in the heat pump mode of operation, the refrigerant can be or is conveyed from the high-pressure side of the compressor into the internal heating condenser, can be or is conveyed from the internal heating condenser via a first expansion valve to the internal heat exchanger, can be or is conveyed from the internal heat exchanger to the external heat exchanger through an expansion valve through which refrigerant can flow in both directions, can be or is conveyed from the external heat exchanger to the low-pressure side of the compressor, and in the cooling system mode of operation, the refrigerant can be or is conveyed from the high-pressure side of the compressor into the internal heating condenser, can be or is conveyed from the internal heating condenser to the external heat exchanger while bypassing the first expansion valve, can be conveyed from the external heat exchanger to the internal heat exchanger via the expansion valve through which refrigerant can flow in both directions, from the internal heat exchanger to the low-pressure side of the compressor.

The invention also comprises a method for operating an air-conditioning system in a heat pump mode of operation and in a cooling system mode of operation.

21 Claims, 11 Drawing Sheets

(58) Field of Classification Search
USPC .......................................................... 62/80
See application file for complete search history.

(56) References Cited

U.S. PATENT DOCUMENTS

| | | |
|---|---|---|
| 6,966,197 B2 | 11/2005 | Itoh et al. |
| 7,003,975 B2 | 2/2006 | Feuerecker |
| 7,055,590 B2 * | 6/2006 | Hara ................ B60H 1/00314 165/202 |
| 7,080,520 B2 | 7/2006 | Satzger |
| 2002/0184908 A1 | 12/2002 | Brotz et al. |
| 2003/0019232 A1 | 1/2003 | Matsuo et al. |
| 2003/0182961 A1 | 10/2003 | Nishida et al. |
| 2004/0060316 A1 | 4/2004 | Ito et al. |
| 2005/0072175 A1 | 4/2005 | Umeo et al. |
| 2005/0103487 A1 | 5/2005 | Aflekt et al. |
| 2007/0157647 A1 * | 7/2007 | Duhme ............ B60H 1/00278 62/196.4 |
| 2007/0283703 A1 * | 12/2007 | Heckt ............ B60H 1/00907 62/3.61 |

FOREIGN PATENT DOCUMENTS

| | | |
|---|---|---|
| DE | 1944583 A1 | 6/1970 |
| DE | 196 44 583 | 4/1998 |
| DE | 100 36 038 A1 | 2/2002 |
| DE | 10 123 830 A1 | 11/2002 |
| DE | 101 28 164 A1 | 12/2002 |
| DE | 101 55 244 | 2/2003 |
| DE | 103 01 006 A1 | 7/2003 |
| DE | 103 43 818 A1 | 4/2004 |
| DE | 10203772 A1 | 4/2004 |
| DE | 10 310 992 | 9/2004 |
| DE | 10 2005 048 241 A1 | 4/2007 |
| DE | 10 2006 026 359 | 12/2007 |
| DE | 10 2008 017 113 A1 | 10/2009 |
| EP | 1397265 B1 | 3/2004 |
| EP | 1467879 B1 | 10/2004 |
| EP | 1 472 106 | 11/2004 |
| EP | 1 961 593 A1 | 8/2008 |
| JP | 3436872 B2 * | 8/2003 |
| JP | 2004-114735 A | 4/2004 |
| JP | 2004182109 A * | 7/2004 |
| WO | WO 2003/064193 | 8/2003 |

OTHER PUBLICATIONS

Search Report issued for German Patent Application No. 10 2010 044 416.2, dated Apr. 6, 2011.

Search Report issued for German Patent Application No. 10 2011 109 055.3, dated Mar. 26, 2012.

* cited by examiner

AIR-CONDITIONING SYSTEM FOR A VEHICLE AND METHOD FOR AIR-CONDITIONING A VEHICLE

CROSS-REFERENCE TO RELATED APPLICATIONS

This application is a National Phase Application of PCT International Application No. PCT/EP2011/004378, International Filing Date Aug. 31, 2011, claiming priority of German Patent Application No. 10 2010 044 416.2, filed Sep. 4, 2010, and German Patent Application No. 10 2011 109 055.3, filed Jul. 30, 2011, each of which is hereby incorporated by reference.

BACKGROUND OF THE INVENTION

The invention relates to an air-conditioning system for a vehicle as well as to a method for air conditioning a vehicle, each according to the generic parts of the independent claims.

It is a known procedure to use of refrigerant circuits in air-conditioning systems in the heat pump mode of operation, on the one hand, and in the cooling system mode of operation, on the other hand. Air-conditioning systems operated in this manner are especially attractive for use in vehicles since modern engine concepts produce less waste heat that can be employed to heat the passenger compartment than older engines did. German patent DE 10 310 992 B4 discloses a combined cooling system circuit and heat pump circuit comprising a compressor, an external heat exchanger, an internal heat exchanger and an inner heat exchanger. In the heat pump operation, the refrigerant that is compressed in the compressor is conveyed via a multi-way valve to the internal heat exchanger, where the refrigerant releases heat to the air intended for the passenger compartment. Then, the cooled-off refrigerant flows through an expansion member through which refrigerant can flow in both directions and, at a low pressure, it reaches the internal heat exchanger, which is in the heat pump circuit where the refrigerant is at a low pressure level, after which flows into the external heat exchanger, where it is supposed to evaporate while absorbing heat. Via the accumulator, the refrigerant vapor then reaches the internal heat exchanger, which is likewise at a low pressure level, on the low-pressure side of the compressor.

Moreover, European patent specification EP 1 472 106 B1 describes an air-conditioning system for a vehicle, comprising an evaporator, a compressor, a condenser and an expansion valve, which are arranged in a refrigerant circuit in such a way that, when the air-conditioning system is in the cooling mode of operation, the compressor conveys a refrigerant via the condenser and the expansion valve and, when it is in the heating mode of operation, it conveys the refrigerant to the evaporator while bypassing the condenser. Furthermore, the air-conditioning system has a coolant circuit of a heat source, whereby the refrigerant circuit is coupled to the coolant circuit of the heat source via a coupling heat exchanger. The coupling heat exchanger is arranged between the compressor and the expansion valve in the flow direction of the refrigerant.

Furthermore, German patent application DE 10 123 830 A1 discloses an air-conditioning system with a heating system heat exchanger connected to a cooling fluid circuit of an internal combustion engine, and an evaporator is installed upstream from said heat exchanger in the flow direction of a blower, whereby, during the cooling mode of operation, a compressor conveys a refrigerant in a coolant circuit via a gas cooler as well as via an expansion valve, and, during the heating mode of operation, it bypasses the gas cooler. A coupling heat exchanger is provided between the coolant circuit and the refrigerant circuit, said coupling heat exchanger also being arranged on the side of the refrigerant circuit on the pressure side of the compressor upstream from the gas cooler.

German patent application DE 10 2005 048 241 A1 discloses a vehicle air-conditioning system having a thermodynamic primary circuit comprising a compressor controlled by a switching mechanism, and having secondary cooling circuit that can be thermodynamically coupled to the primary circuit for purposes of cooling electric aggregates, for example, a battery, said secondary cooling circuit containing at least one component that responds to a signal from the switching mechanism of the primary circuit. U.S. Pat. Appln. 2003/0182961 A1 relates to an air-conditioning system for a passenger compartment. The air-conditioning system has a compressor, an external heat exchanger and an internal heat exchanger. Moreover, the air-conditioning system has a cooling heat exchanger and a decompression unit that is situated upstream from the cooling heat exchanger and that is opened when it is in the cooling mode of operation. German patent application DE 103 01 006 A1 relates to a heating/cooling circuit for a motor vehicle, comprising an evaporator for cooling off air that is to be conveyed into a vehicle interior, a heating heat exchanger for heating up the air that is to be conveyed into the vehicle interior, an external heat exchanger with a compressor for conveying refrigerant, a first expansion member that is associated with the evaporator, a second expansion member that is associated with the external heat exchanger, and refrigerant lines via which the above-mentioned components are connected to each other, whereby a defrosting arrangement of the circuit comprises the compressor, the external heat exchanger, and the second expansion member.

German patent DE 196 44 583 B4 describes a vehicle air-conditioning system comprising a refrigerant circuit, whereby two serially installed condensers are provided on a compressor on the high-pressure side, one of which, when the system is in the heating mode of operation and in the reheating mode of operation, is configured for heating up an air-conditioning air stream, and, when the system is in the cooling mode of operation and optionally in the reheating mode of operation, the other condenser is configured for cooling off the refrigerant by means of a cooling-air stream that is released into the outside surroundings of the vehicle.

The objective of the present invention is to condition the air of a vehicle by means of a heat pump circuit and a cooling system circuit through which a refrigerant can flow, whereby on-demand heating of the vehicle's passenger compartment is to be implemented by means of an internal heating condenser.

This objective is achieved according to the invention by means of the features of the independent claims.

An air-conditioning system according to the invention for a vehicle, comprising a refrigerant circuit through which a refrigerant can flow and which is configured as a heat pump circuit and as a cooling system circuit, and associated with these, a compressor, at least one external heat exchanger and at least one internal heat exchanger that is associated with an internal heating condenser, and comprising a device for generating an air stream that can be thermally coupled to the internal heat exchanger and to the internal heating condenser, as well as comprising a metering device that can meter the flow of at least a partial stream of the thermally coupled air stream through the internal heating condenser, is characterized in that in the heat pump mode of operation, the refrigerant can be or is conveyed from the high-pressure side of the compressor into the internal heating condenser, can be or is conveyed from the internal heating condenser via an expansion valve to the internal heat exchanger, can be or is conveyed from the internal heat exchanger to the external heat exchanger through an expansion valve through which refrigerant can flow in both directions, can be or is conveyed from the external heat exchanger to the low-pressure side of the compressor, and in the cooling system mode of operation, the refrigerant can be or is conveyed from the high-pressure side of the compressor directly into the internal heating condenser, can be or is conveyed from the internal heating condenser to the external heat exchanger while bypassing the expansion valve, can be conveyed from the external heat exchanger to the internal heat exchanger via the expansion valve through which refrigerant can flow in both directions, from the internal heat exchanger to the low-pres sure side of the compressor.

A continuous flow through the internal heating condenser allows a short response time for the heating that takes place by means of the internal heating condenser.

The arrangement of an expansion valve between the internal heating condenser and the evaporator in the heat pump circuit allows heat to be released to air that is flowing through the internal heating condenser, and, depending on the temperature and humidity of the air stream coupled to the internal heat exchanger, permits a flexibly regulated heating or cooling of the air stream by means of the internal heat exchanger. The expansion valve is preferably switchable, so that no additional switching components are needed in order to prevent the through-flow in the cooling system mode of operation. In the heat pump mode of operation and in the cooling system mode of operation, the refrigerant can be or is conveyed directly into the internal heating condenser and refrigerant flows continuously through the internal heating condenser, whereby a flow of at least a partial stream of the thermally coupled air stream through the internal heating condenser can be metered by means of a metering device, and thus, it is very easy to influence the temperature of the air that is flowing into the passenger compartment. Advantageously, the internal heat exchanger and the internal heating condenser are accommodated together in the housing of an air-conditioning unit installed in the vehicle. The internal heat exchanger is especially configured as an evaporator. The external heat exchanger is preferably a condenser or a gas cooler that functions as an evaporator during the heat pump mode of operation. The device for generating the air stream that is thermally coupled to the heat exchanger and to the internal heating condenser is especially a blower, preferably a controlled or regulated blower. The thermal coupling of the generated air stream to the internal heat exchanger is especially achieved by means of the flow through the appropriately configured internal heat exchanger. Optionally, a collector can be arranged in the heat pump circuit and/or in the refrigerant circuit on the low-pres sure side downstream from the compressor, and this collector can protect the compressor against hydraulic shocks caused by refrigerant that has not evaporated.

The following applies to all of the embodiments: the components of the air-conditioning system through which the refrigerant can flow such as, for instance, the compressor, the external heat exchanger, the internal heat exchanger, the internal heating condenser, the expansion valve or the like are all connected by refrigerant lines. Preferably, at least one of the expansion valves, especially preferably every expansion valve, is configured as a thermostatic or electronic expansion valve. With a thermostatic expansion valve, the quantity of refrigerant injected into a downstream evaporator can be regulated as a function of the temperature. The regulation is carried out as a function of the overheating of the refrigerant vapor at the outlet of the evaporator. The amount of refrigerant injected into the evaporator is only such that the entire injected amount can evaporate completely. Electronic expansion valves have the same function as the thermostatic expansion valves, but they regulate the fluid quantity by means of resistance thermometers.

In another embodiment of the invention, a switching valve is provided through which the refrigerant can flow and which is arranged downstream from the external heat exchanger and upstream from the low-pressure side of the compressor in the heat pump circuit, and downstream from the internal heat exchanger and upstream from the external heat exchanger in the cooling system circuit.

Furthermore, advantageously a shut-off valve is provided through which refrigerant can flow and which is arranged downstream from the expansion valve in the heat pump circuit, and downstream from the internal heat exchanger and upstream from the low-pressure side of the compressor in the cooling system circuit.

Thus, the switchover from the heat pump mode of operation to the cooling system mode of operation and vice versa can be achieved very easily by means of the switchable expansion valve, the switch-over valve and the shut-off valve.

In another embodiment, the air-conditioning system is thermally coupled via a first fluid refrigerant heat exchanger to a first fluid circuit that comprises at least one heat sink and/or cold sink connected to the fluid refrigerant heat exchanger on the fluid side. The heat sink and the cold sink are especially aggregates through which fluid flows and which are installed in the vehicle, for example, they are the cooler of an internal-combustion engine, of an electric motor or of a battery of the vehicle, via which a considerable amount of heat can be coupled into and/or out of the air-conditioning system. The fluid is preferably water to which other fluids can have been added.

The first fluid refrigerant heat exchanger as well as those mentioned below can be so-caller chillers that are finding ever-greater use in the automotive sector. The application purpose is to cool thermally sensitive components that constitute heat sources such as, for example, the above-mentioned high-voltage batteries, power electronic components or charging devices. Chillers are considered to be compact and inexpensive systems, whereby until now, primarily plate heat exchangers have been used in the automotive sector. Such a plate heat exchanger is known, for example, from German patent application DE 10 2008 017 113 A1, which has a plurality of plates stacked parallel to each other in a vertical direction and having flush cutouts through which a first fluid configured as a refrigerant as well as a second fluid are conveyed and discharged.

In another embodiment of the air-conditioning system, it is provided that the refrigerant circuit and/or the heat pump circuit as well as the cooling system circuit have a first branching point between the external heat exchanger and the expansion valve through which refrigerant can flow in both directions, and they have a first connection point on the low-pressure side of the compressor, whereby, in the heat pump mode of operation and/or in the cooling system mode of operation, refrigerant can be conveyed on the refrigerant side through the fluid refrigerant heat exchanger from the branching point to the connection point, so that thermal energy can be withdrawn from the fluid circuit or fed into it so that this can then be used to heat or cool the passenger compartment.

Advantageously, a second expansion valve is arranged between the branching point and the fluid refrigerant heat exchanger, so that the temperature of the refrigerant downstream from the expansion valve can be reduced before the refrigerant flows through the fluid refrigerant heat exchanger.

In another embodiment of the invention, in the heat pump circuit as well as in the cooling system circuit between the branching point and the fluid refrigerant heat exchanger, there is a switchover valve through which refrigerant can flow and by means of which the conveyance of refrigerant to the fluid refrigerant heat exchanger can be interrupted or permitted through the second expansion valve, or else by means of which the second expansion valve can be bridged. In a simple manner, the arrangement of such a switchover valve increases the flexibility of the air-conditioning system in order to select the temperature setting in the passenger compartment.

Another embodiment of the air-conditioning system is characterized in that the refrigerant circuit and/or the heat pump circuit as well as the cooling system circuit have a second branching point between the internal heat exchanger and the expansion valve through which refrigerant can flow in both directions, and they have a first connection point and a second connection point upstream from the low-pressure side of the compressor, whereby, in the heat pump mode of operation and/or in the cooling system mode of operation, refrigerant can be conveyed through the first fluid refrigerant heat exchanger from the second branching point to the first connection point, and through the second fluid refrigerant heat exchanger from the second branching point to the second connection point. This makes it possible to distribute the refrigerant flow directly after the evaporator to the external heat exchanger and to the two fluid refrigerant heat exchangers, and thus to set a defined energy input into the refrigerant via the above-mentioned components. Furthermore, this embodiment makes it possible to heat and cool with the second fluid refrigerant heat exchanger, also independently of the operation of the external heat exchanger. Moreover, this embodiment permits parallel heating of the passenger compartment and defrosting of an iced-over external heat exchanger.

Of course, additional fourth, fifth, etc. fluid refrigerant heat exchangers can be provided between the second branching point and the second connection point in series or in parallel to the second fluid refrigerant heat exchanger.

Another embodiment of the air-conditioning system is characterized in that the refrigerant circuit and/or the heat pump circuit as well as the cooling system circuit have a third branching point between the internal heating condenser and the first expansion valve, and they have a third connection point upstream from the low-pressure side of the compressor, whereby a third fluid refrigerant heat exchanger is arranged between the third branching point and the third connection point, and, in the heat pump mode of operation and/or in the cooling system mode of operation, refrigerant can be conveyed from the third branching point to the third connection point through the third fluid refrigerant heat exchanger. This embodiment permits additional heating or cooling via the third fluid refrigerant heat exchanger, also independently of the operation of the evaporator.

Another embodiment of the air-conditioning system is characterized in that, in the first and/or second fluid circuit (s), there is an auxiliary heater by means of which heat can be conveyed into the cooling system circuit, whereby this embodiment permits parallel heating by withdrawing thermal energy from the air and conveying it via the auxiliary heater.

A method according to the invention for air conditioning a vehicle is characterized in that the above-mentioned air-conditioning system is operated in a heat pump mode of operation or in a cooling system mode of operation, whereby in the heat pump mode of operation as well as in the cooling system mode of operation, the refrigerant is conveyed from the high-pressure side of the compressor into the internal heating condenser. The advantages achieved by this correspond to those of the air-conditioning system described above.

In another embodiment of the invention, refrigerant flows through the first expansion valve during the heat pump mode of operation, whereas refrigerant does not flow through in the cooling system mode of operation.

In another embodiment of the invention, during the heat pump mode of operation, an amount of at least 5%, preferably at least 7.5%, of the air mass flow of the thermally coupled air stream flows through the internal heating condenser, so that the temperature of the passenger compartment can be raised.

In another embodiment of the invention, in the cooling system mode of operation, an amount of at the most 1.5%, preferably at the most 2.5%, of the air mass flow of the thermally coupled air stream flows through the internal heating condenser and thus, cooled air is conveyed directly into the passenger compartment through the internal heat exchanger, without being substantially heated up by the internal heating condenser.

In another embodiment of the invention, in the cooling system mode of operation, an amount of at least 1.5%, preferably at least 2.5%, of the air mass flow of the thermally coupled air stream flows through the internal heating condenser, so that air that has been cooled and dried by the internal heat exchanger is heated up on the internal heating condenser, as a result of which an additional heating function for the passenger compartment can be provided in a simple manner, especially in the in-between seasons.

Additional advantages, features and details are presented in the description below in which—if applicable, with reference to the drawing—at least one embodiment is described in detail. Described and/or presented features, on their own or in any meaningful combination, constitute the invention, if applicable also independently of the claims, and can especially also be the subject matter of one or more separate inventions. Identical, similar and/or at least functionally identical parts are designated with the same reference numerals.

Figure 2:
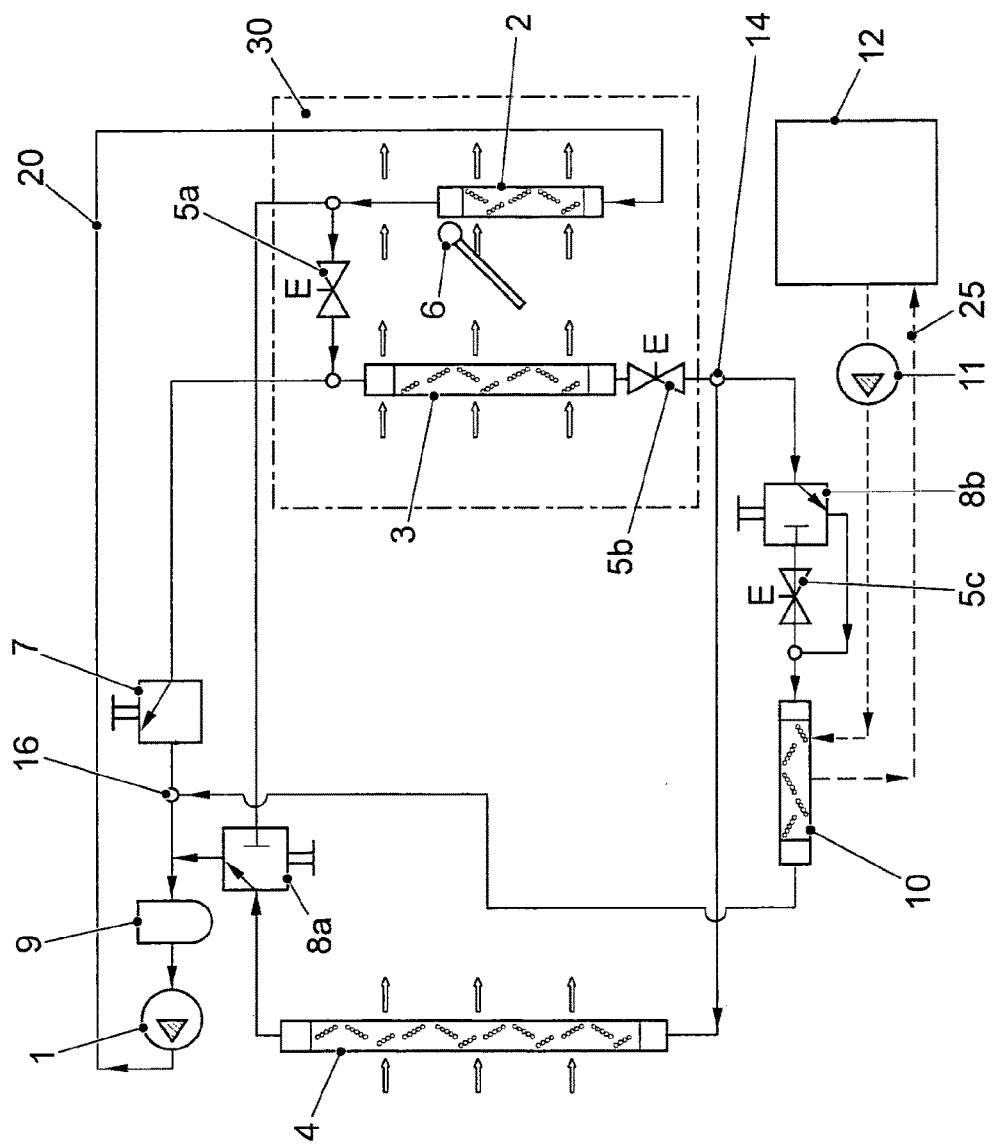
Figure 3:
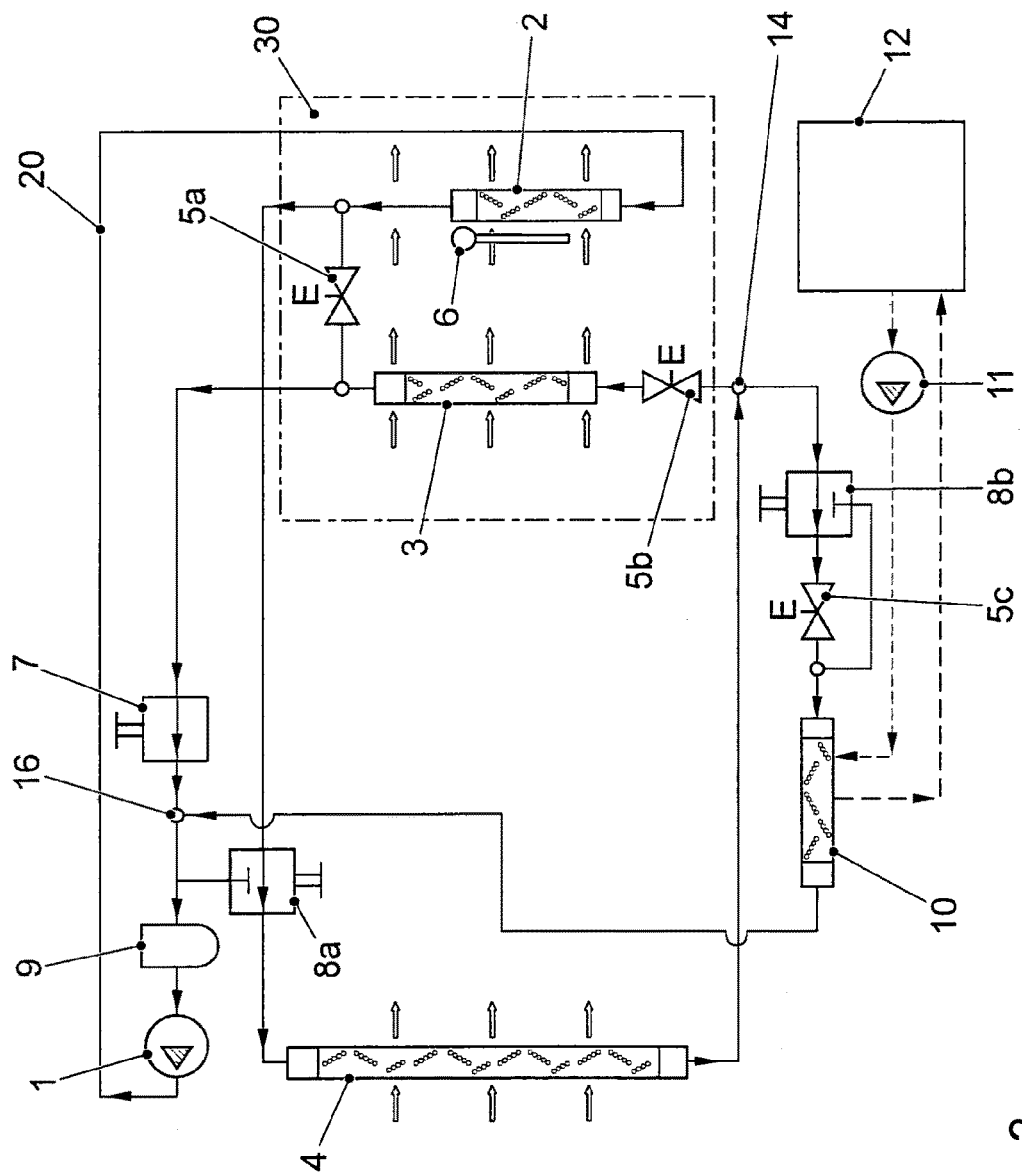
Figure 4:
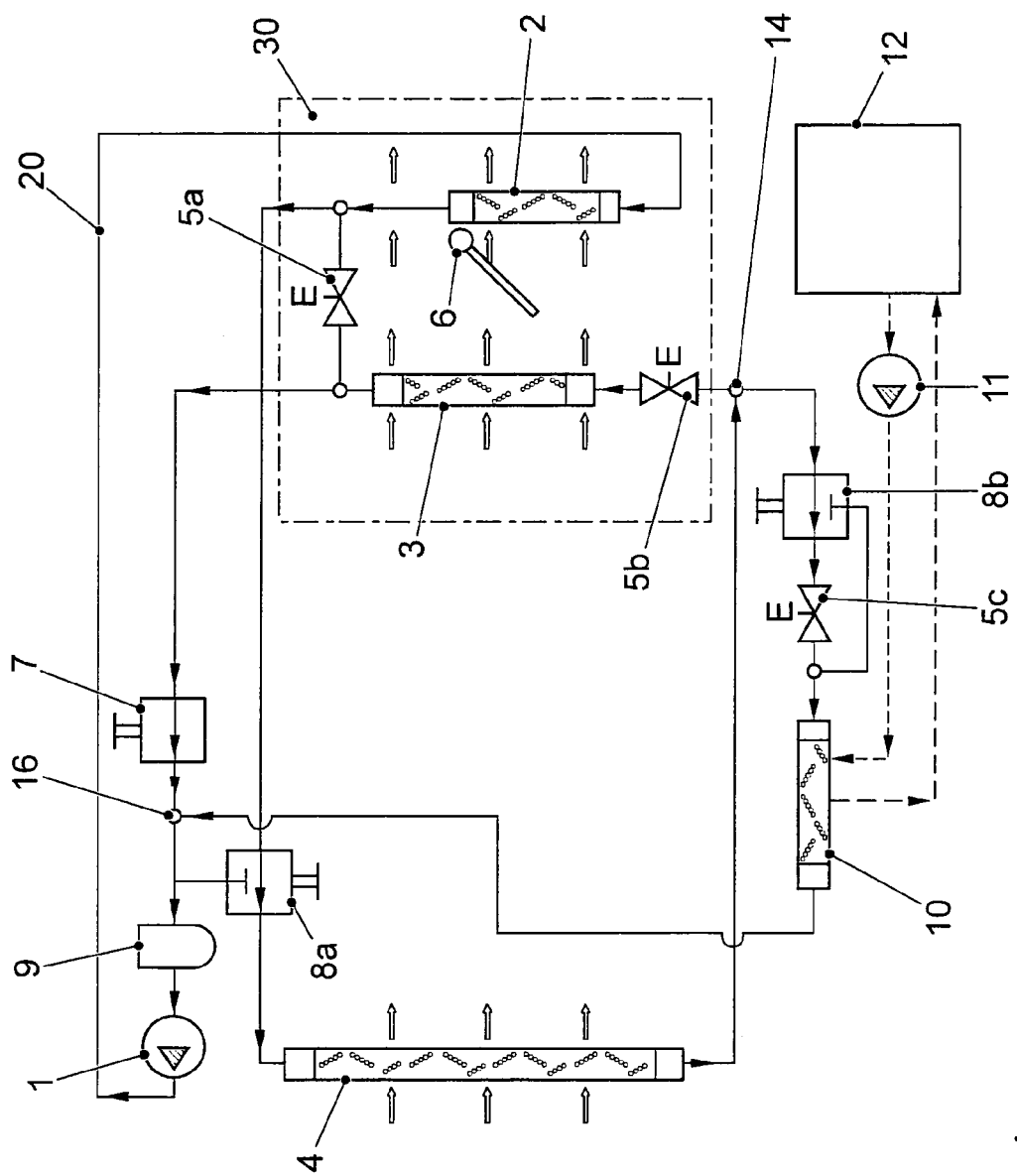
Figure 5:
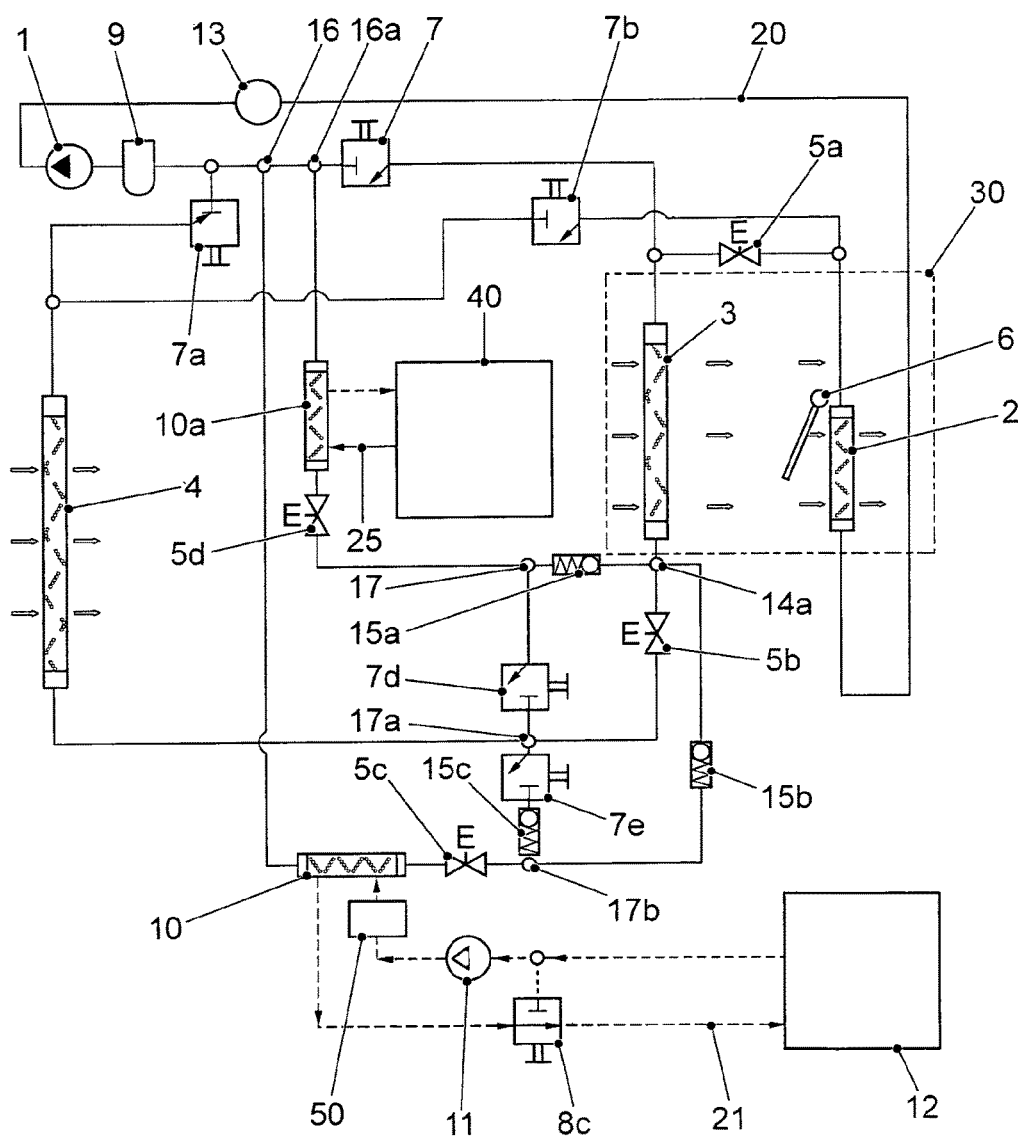
Figure 5A:
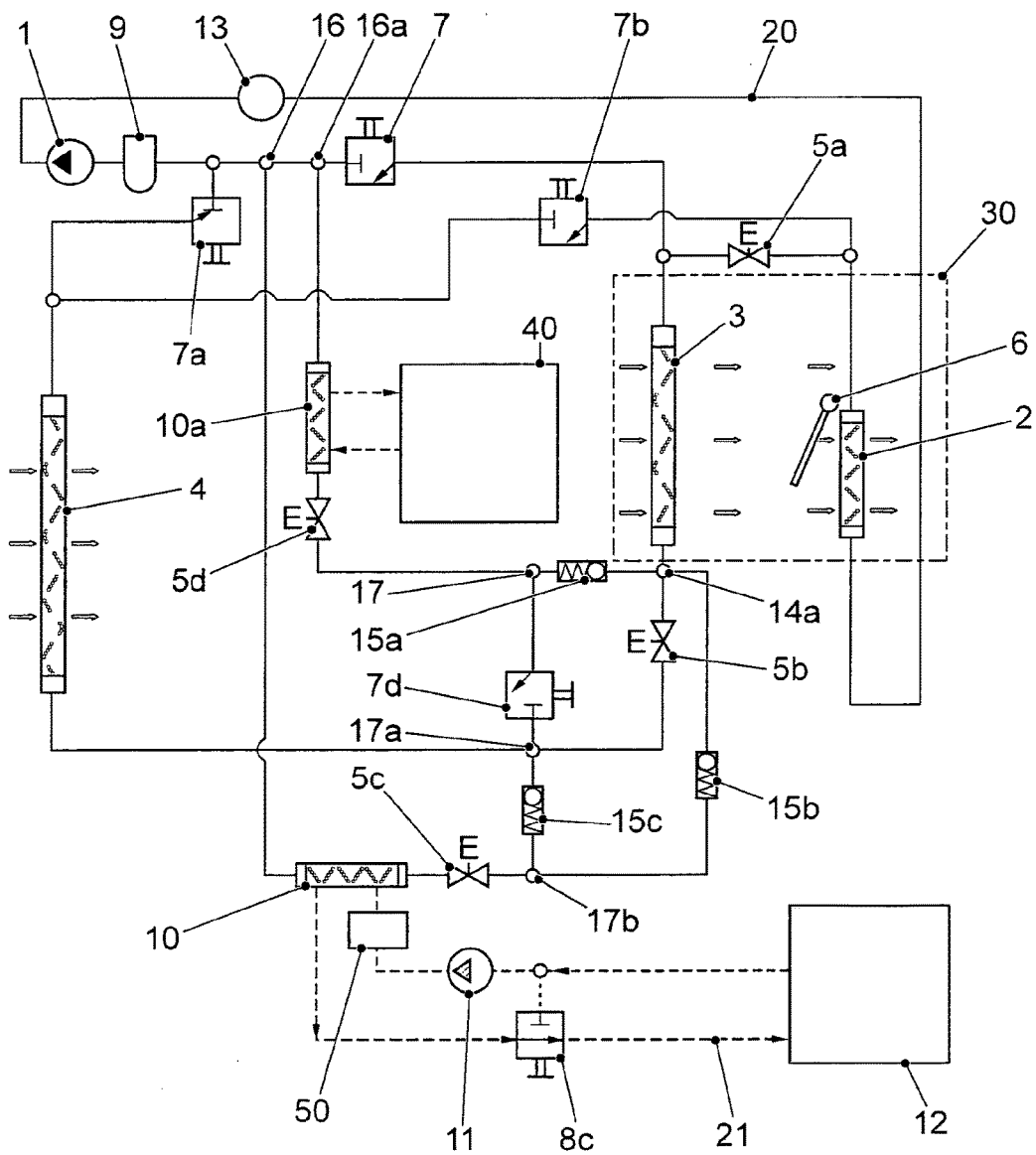
Figure 6:
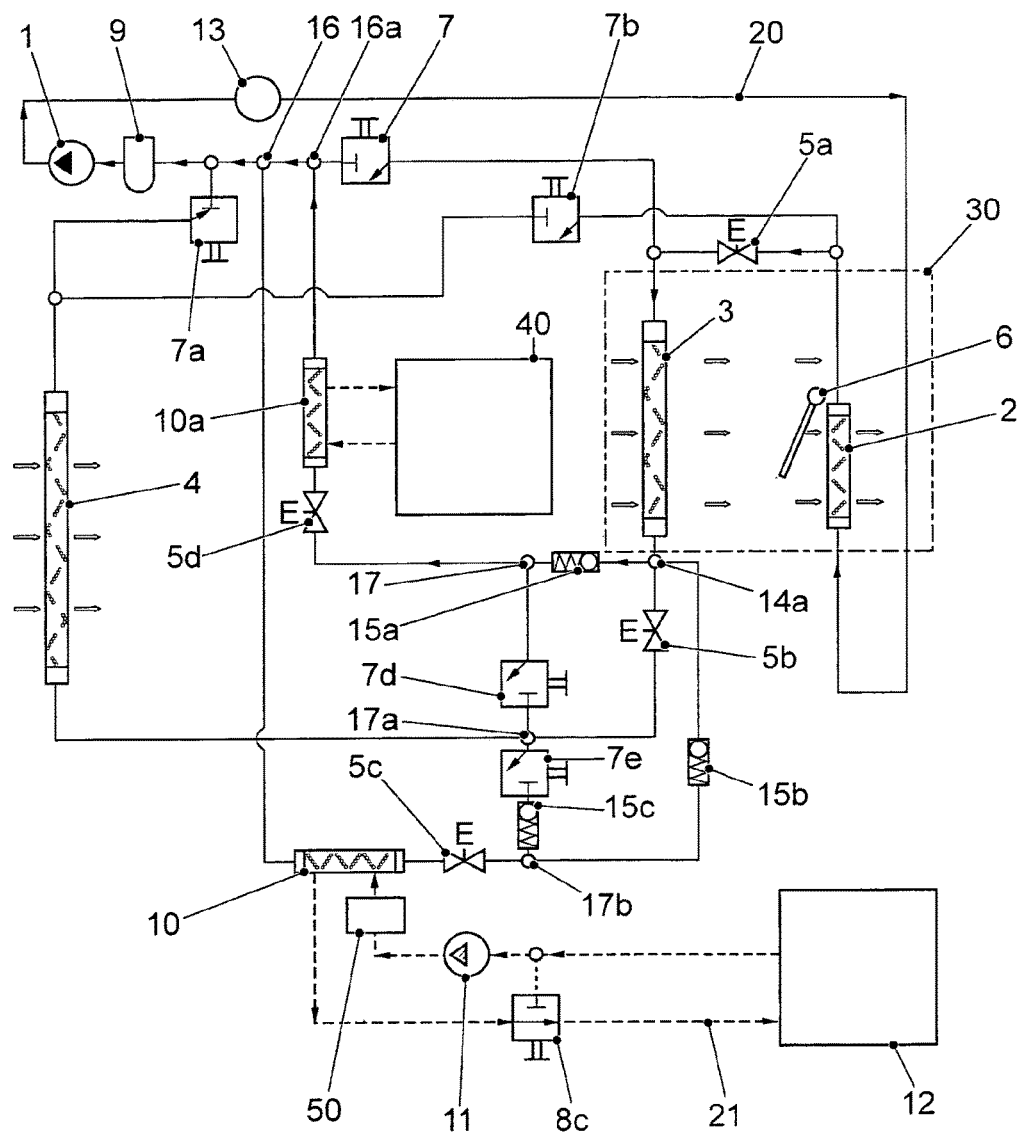
Figure 7:
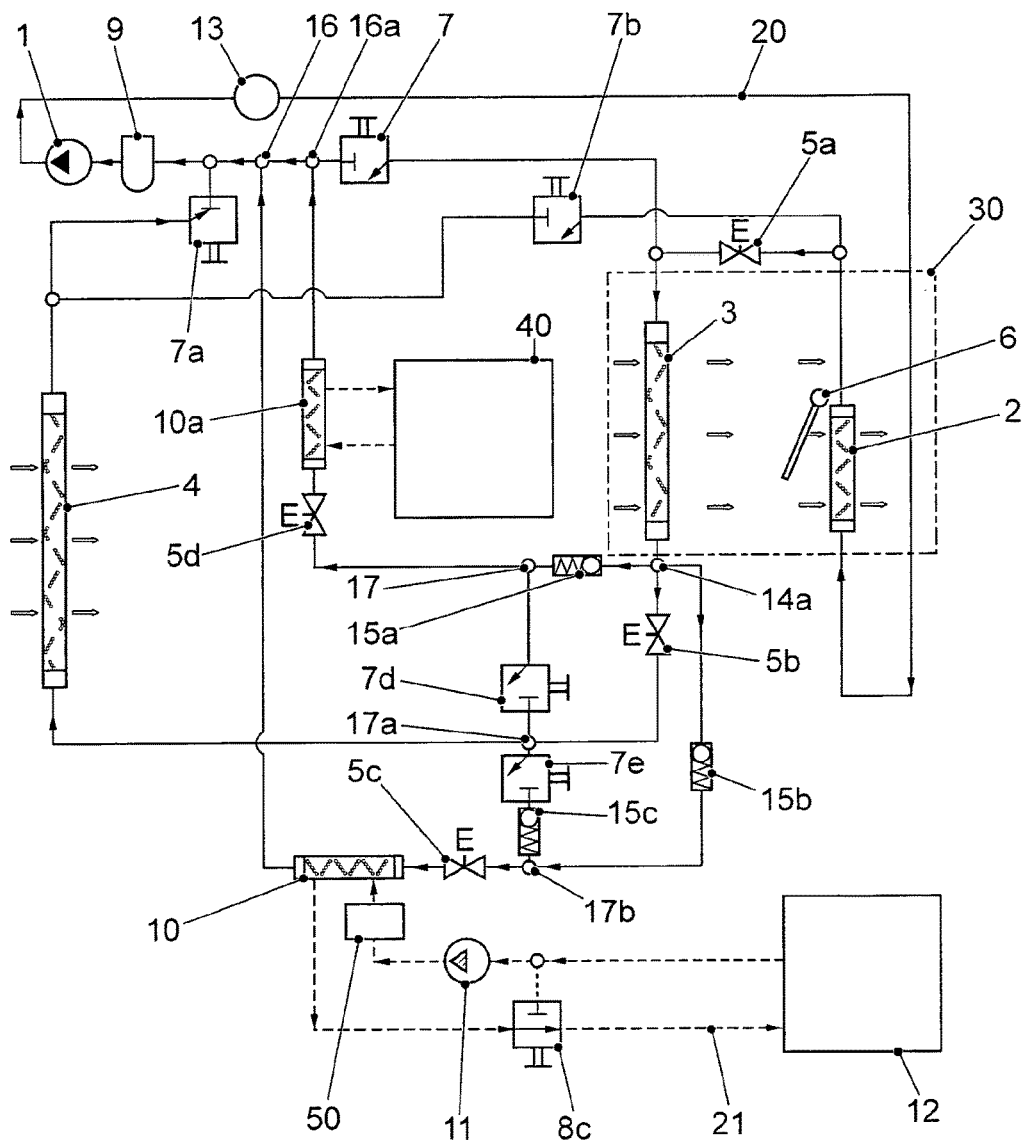
Figure 8:
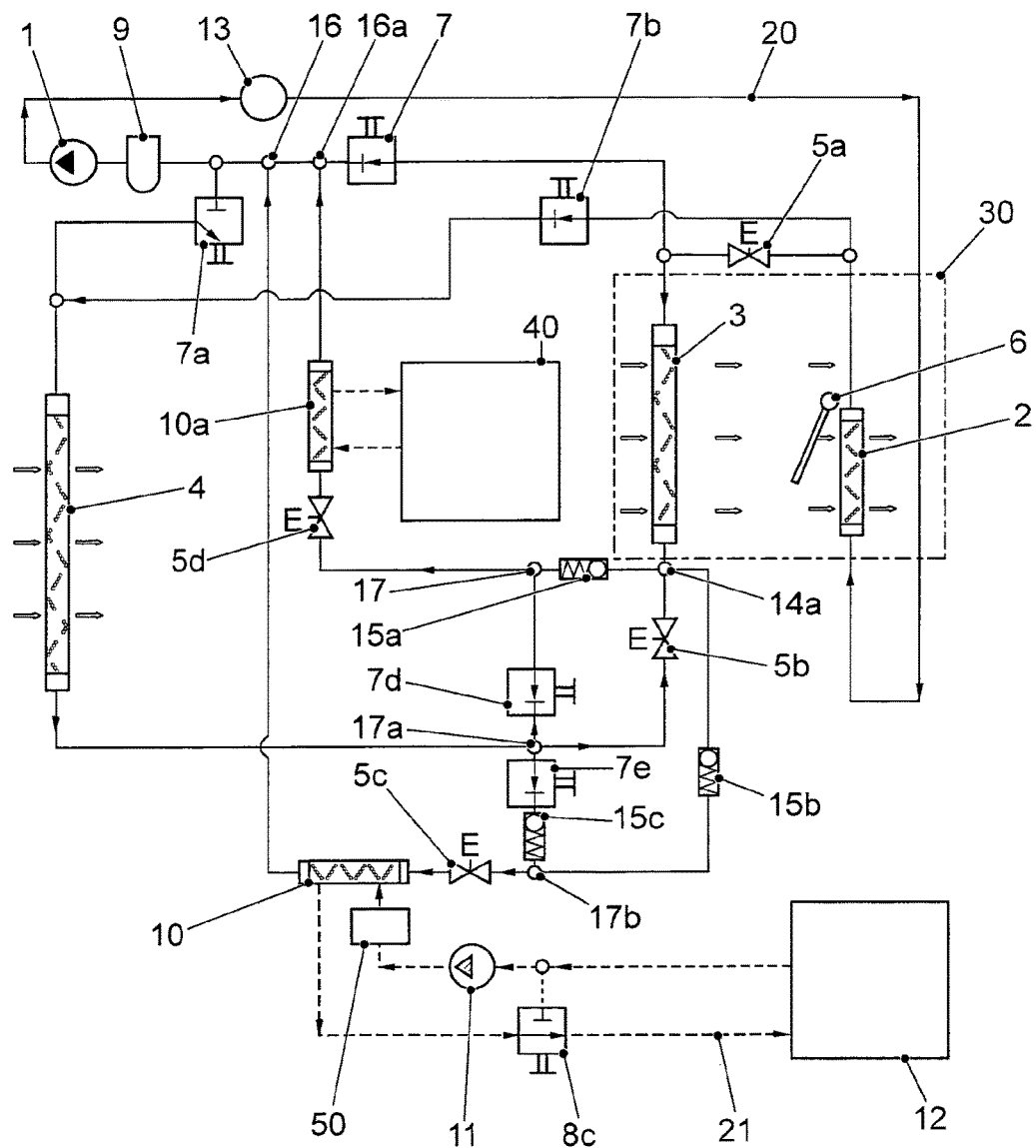
Figure 9:
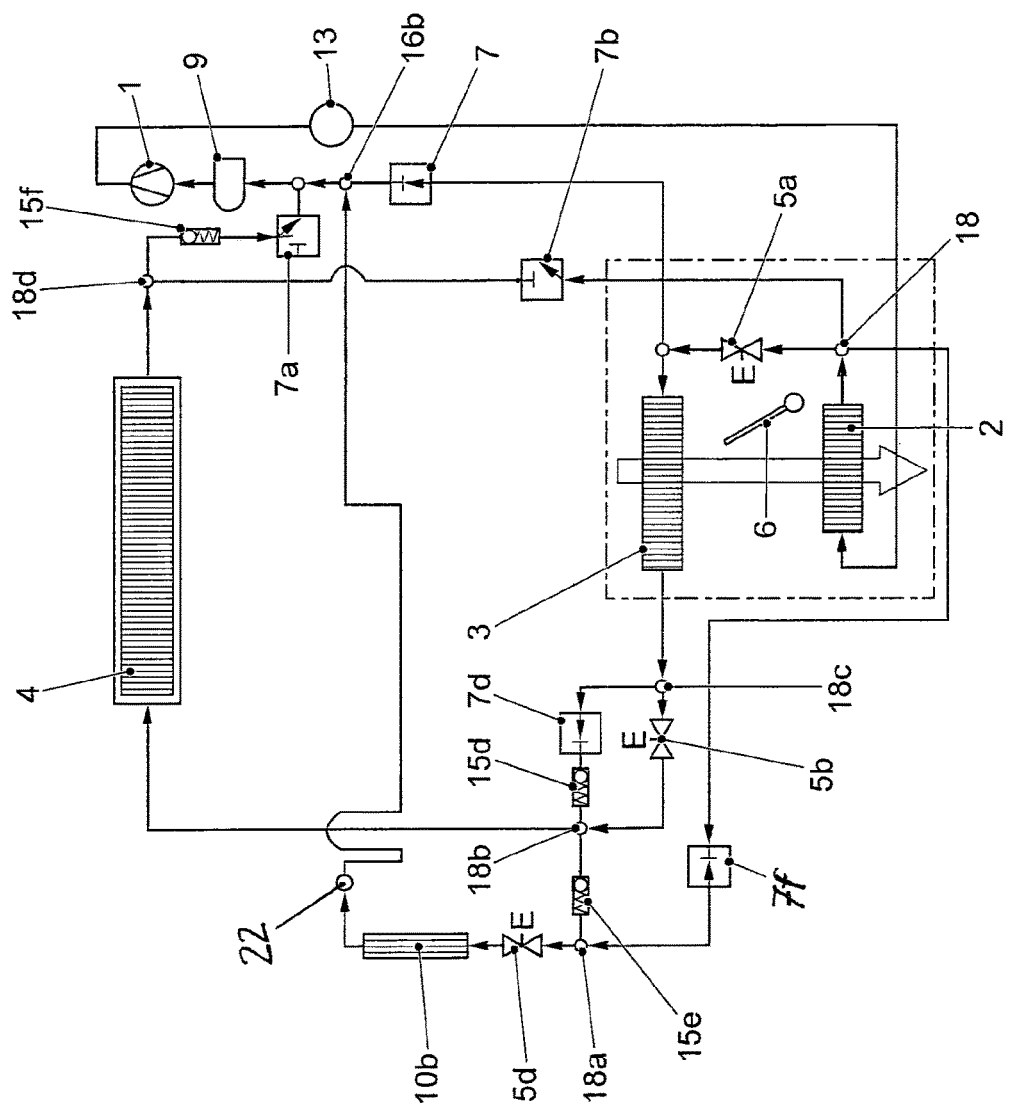
Figure 10:
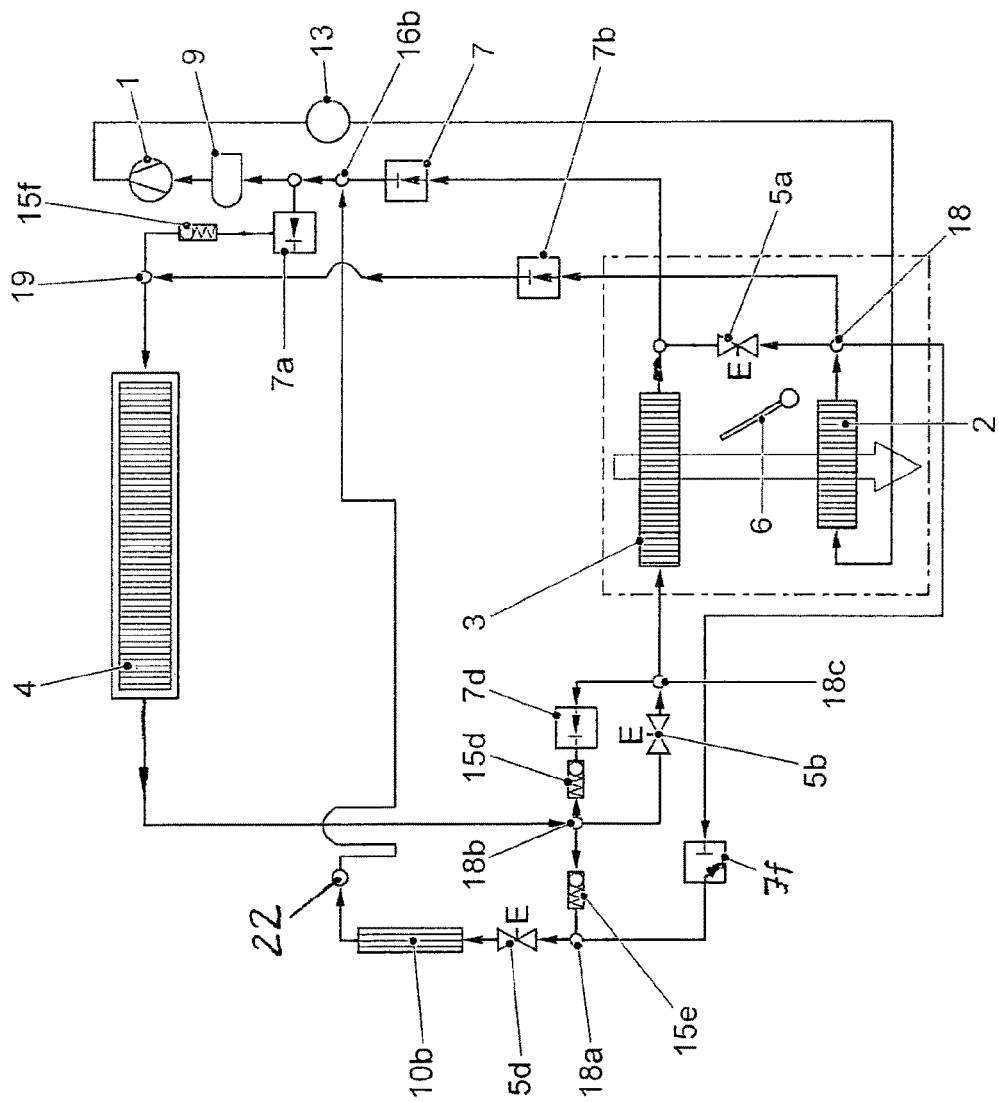

The following is shown:

FIG. 1 a heat pump circuit and a cooling system circuit, whereby in the heat pump mode of operation as well as in the cooling system mode of operation, the refrigerant can be conveyed from the high-pressure side of the compressor into the internal heating condenser, FIG. 2 a heat pump circuit that is thermally coupled to a heat sink and/or a cold sink, FIG. 3 a cooling system circuit that is thermally coupled to a heat sink and/or a cold sink, FIG. 4 the cooling system circuit of FIG. 3 in a reheating mode of operation, FIG. 5 a variant of the heat pump circuit and of the cooling system circuit of FIG. 1 with two fluid refrigerant heat exchangers, FIG. 5a a modification of the circuits of FIG. 5, FIG. 6 a cooling system circuit according to FIG. 5, FIG. 7 a heat pump circuit according to FIG. 5, FIG. 8 a cooling system circuit with a concurrent defrosting function of an external heat exchanger, FIG. 9 another variant of the circuits of FIG. 1 in a heat pump mode of operation, FIG. 10 another variant of the circuits of FIG. 1 in a cooling system mode of operation.

FIG. 1 shows a refrigerant circuit configured as a heat pump circuit and as a cooling system circuit of a vehicle (not shown here), especially a motor vehicle. A refrigerant can flow through the heat pump circuit as well as through the cooling system circuit, and these circuits serve to air condition a passenger compartment (likewise not shown here) that has an air-conditioning system. Of course, the individual components of the air-conditioning system or of the heat pump circuit as well as of the cooling system circuit are controlled or regulated by a control unit with associated sensors, actuators and electric connections. The heat pump circuit and the cooling system circuit especially comprise a compressor 1, an internal heating condenser 2, an internal heat exchanger 3 that is preferably configured as an evaporator, an external heat exchanger 4 that is preferably configured as a condenser, gas cooler or evaporator, expansion valves 5a, 5b, a device (not shown in greater detail here), normally a blower, for generating an air stream that is thermally coupled to the heat exchanger 3 and to the internal heating condenser 2, indicated by arrows in FIG. 1, a metering device 6 by means of which the flow of at least a partial stream of the thermally coupled air stream through the internal heating condenser can be metered, a shut-off valve 7 with which the conveyance of refrigerant from the internal heat exchanger 3 to the low-pressure side of the compressor 1 can be permitted and/or interrupted, a switchover valve 8a and a collector 9 that is arranged upstream from the compressor on the low-pressure side but that is optional. The metering device 6 is preferably configured as a temperature-control flap by means of which the air stream that strikes the internal heating condenser 2 can be deflected or interrupted. The device for generating the air stream as well as the metering device 6 are accommodated together in a housing 30 of an air-conditioning device, whereby it goes without saying that other configurations of these two components are also conceivable. Of course, the individual components of the refrigerant circuit are connected to each other via refrigerant lines 20.

FIG. 2 shows the refrigerant circuit of FIG. 1 in the heat pump mode of operation, whereby in addition, an optional fluid circuit is shown that is thermally connected to the air-conditioning system by means of a fluid refrigerant heat exchanger 10, and said fluid circuit comprises at least one heat sink and/or cold sink 12 connected on the fluid side to the refrigerant heat exchanger 10. A branching point 14 as well as a connection point 16 are provided in the refrigerant circuit in order to thermally couple the fluid circuit to the refrigerant circuit. A switchover valve 8b, an expansion valve 5c and the fluid refrigerant heat exchanger 10 are arranged one after the other between the branching point 14 and the connection point 16. A pump 11 for conveying the fluid of the fluid circuit through the fluid refrigerant heat exchanger is arranged in the fluid circuit. The fluid circuit also has fluid lines 20 that connect the various components to each other.

In the heat pump mode of operation, the refrigerant is conveyed from the high-pressure side of the compressor 1 directly into the internal heating condenser 2, it flows through the first expansion valve 5a, is subsequently conveyed into the internal heat exchanger 3 that is downstream from the expansion valve 5a, then through the expansion valve 5b through which the refrigerant can flow in both directions to the downstream branching point 14, from there to the external heat exchanger 4, where it can absorb heat and subsequently be conveyed to the downstream switchover valve 8a. From the branching point 14, the refrigerant is conveyed as a function of the switching state of the switchover valve 8b, which will be elaborated upon below. From the switchover valve 8a, the refrigerant is conveyed to the low-pressure side of the compressor 1, if applicable, via the collector 9 installed in-between. In the heat pump mode of operation shown in FIG. 2, heat is absorbed from or released into the air that is flowing through the internal heat exchanger 3 as a function of its current state, especially its temperature. The air that has been conditioned in this manner is conveyed to the internal heating condenser 2, at least partially as a function of the position of the temperature-control flap 6, it is heated by said internal heating condenser 2 and conveyed into the passenger compartment. In a switching state in which the refrigerant is being conveyed from the branching point 14 through the fluid refrigerant heat exchanger 10, the switchover valve 8a regulates whether heat is absorbed at the heat sink or released at the cold sink, depending on the temperature of the fluid circulating in the fluid circuit. Heat absorption is improved when the refrigerant is being conveyed through the expansion valve 5c and thus, after having cooled off, flows through the heat exchanger 10. After flowing through the fluid refrigerant heat exchanger 10, the refrigerant is conveyed to the connection point 16 and subsequently to the downstream collector 9 or to the low-pressure side of the compressor 1.

FIG. 3 shows the refrigerant circuit of FIG. 1 in a cooling system mode of operation, whereby refrigerant is conveyed from the low-pressure side of the compressor 1 to the internal heating condenser 2, from there to the switchover valve 8a, from there to the external heat exchanger 4 and from there to the expansion valve 5b through which refrigerant can flow in both directions. The branching point 14 is optionally installed upstream from the expansion valve through which refrigerant can flow in both directions and, analogously to FIG. 2, an optional heating circuit with a heat and/or cold sink 12 can be thermally coupled to the air-conditioning system via this branching point 14. The refrigerant is conveyed through the expansion valve 5b and through the internal heat exchanger 3 via the opened expansion valve 7 and the optional collector 9 to the low-pressure side of the compressor 1. In the cooling system mode of operation, no refrigerant is conveyed through the expansion valve 5a; the expansion valve 5a is preferably closed. The arrangement and function of the fluid circuit in FIG. 3 are analogous to those shown in FIG. 2, although in FIG. 3, a switching state of the switchover valve 8b is shown in which refrigerant is being conveyed through the expansion valve 5c. In the cooling system mode of operation of the refrigerant circuit shown in FIG. 3, the temperature-control flap 6 has been brought into a position in which only a slight flow, for example, less than 2.5% of the air mass flow conveyed through the internal heat exchanger 3 is being conveyed through the internal heating condenser 2. Thus, the passenger compartment is only being heated to a slight extent.

FIG. 4 shows another mode of operation of the refrigerant circuit according to the invention, analogous to the depiction in FIG. 4, whereby in contrast to this, the temperature-control flap 6 assumes a position in which a larger portion of the air mass flow of the air stream that flows through the heat exchanger flows through the internal heating condenser 2. Accordingly, in the depiction of FIG. 4, the refrigerant circuit is operated in the cooling system mode of operation, although, due to the internal heating condenser 6 [sic], air that had previously been dried by the internal heat exchanger 3 is heated up.

FIG. 5 shows another variant of the refrigerant circuit of FIG. 1, whereby, however, in contrast to the preceding variants, a branching point 14a is provided between the evaporator 3 and the expansion valve 5b through which refrigerant can flow in both directions, and a first connection point 16 as well as a second connection point 16a are provided upstream from the low-pressure side of the compressor 1. A non-return valve 15b and a branching point 17b are arranged one after the other between the branching point 14a and the connection point 16. In the refrigerant circuit, an expansion valve 5c as well as a first fluid refrigerant heat exchanger 10 are arranged between the branching point 17b and the connection point 16. Analogously to FIGS. 2 to 4, the heat exchanger 10 is thermally coupled to a heat sink and/or cold sink 12 via a fluid circuit. An auxiliary heater 50, for example, a water-based PTC (Positive Temperature Coefficient) heater, a fuel auxiliary heater or a high-voltage battery are installed on the fluid side between the water pump 11 and the heat exchanger 10. The branching point 17 is also connected to the refrigerant circuit via a branching point 17a that is arranged between the expansion valve 5b and the external heat exchanger 4. A shut-off valve 7e and a non-return valve 15c are arranged between the branching point 17a and the branching point 17b, whereby the non-return valve 15c only permits refrigerant to flow through from the branching point 17a to the branching point 17b. A non-return valve 15a, a branching point 17 as well as an expansion valve 5d are arranged one after the other between the branching point 14a and the second fluid refrigerant heat exchanger 10a, whereby the non-return valve 15a permits refrigerant to flow through only from the branching point 14a to the branching point 17. A shut-off valve is arranged between the branching point 17 and the branching point 17a.

FIG. 5a shows a modification of the refrigerant circuit of FIG. 5, whereby only a non-return valve 15a is arranged between the branching point 17a and the branching point 17b, and the shut-off valve provided in FIG. 5 is absent. If the expansion valve 5c is configured as a switchable expansion valve, then the refrigerant circuits of FIGS. 5 and 5a are functionally equivalent as far as the possible refrigerant flows are concerned.

In FIGS. 5 and 5a, the heat exchanger 10a is connected to a heat sink and/or cold sink 40 that can be configured analogously to the heat sink and/or cold sink 12. It goes without saying that components that are similar to those between the heat exchanger 10 and the heat sink and/or cold sink 12 can be provided on the fluid side.

The arrangement of the branching point 14a in front of the expansion valve 5b allows an as-needed proportional distribution of refrigerant, whereby the distribution can be set by adjusting the electric expansion valves 5b, 5c and 5d. The shut-off valves 7d and 7e allow a better regulation of the refrigerant flow, especially in the refrigerant circuit upstream from the heat exchangers 14 and 14a. It goes without saying that an embodiment of the invention is also encompassed in which, from the branching point 14a, only one refrigerant line is provided to the branching point 16 or to the branching point 16a, with heat exchangers 10 and 10a installed in-between.

FIG. 6 shows the refrigerant circuit of FIG. 5 at a setting of the valves 7d, 7e and 7a in which cooling and heating take place via the heat exchangers 10 and 10a, while the external heat exchanger 4 is out of operation.

FIG. 7 shows the refrigerant circuit of FIG. 5, whereby the setting of the valves 7a, 7d and 7e allows parallel heating with thermal energy from the air, with thermal energy from the heat sink and/or cold sink 12 or from the auxiliary heater 50 as well as from the heat sink and/or cold sink 40.

For the refrigerant circuit of FIG. 5, FIG. 8 shows a setting of the valves 7, 7a, 7b in which the heated refrigerant can be conveyed to the external heat exchanger 4 and, at the same time, the passenger compartment can be heated by means of the heating condenser 2, whereby, optionally, additional thermal energy can be conveyed via the heat sink and/or cold sink 12, via the auxiliary heater 50 as well as via the heat sink and/or cold sink 40.

Another modification of the refrigerant circuit of FIG. 1 is shown in FIGS. 9 and 10. In the refrigerant circuit or in an associated heat pump circuit as well as in a cooling system circuit, a branching point 18 is arranged between the internal heating condenser 2 and the expansion valve 5a, and a connection point 16b connected thereto is arranged upstream from the low-pressure side of the compressor. A shut-off valve 7f, a branching point 18a and, in an adjoining branch, an expansion valve 5d and a fluid refrigerant heat exchanger 10b are arranged one after the other between the branching point 18 and the connection point 16b. In another branch, the branching point 18a is connected to a branching point 18b that is arranged between the expansion valve 5b and the external heat exchanger 4. Between the evaporator 3 and the expansion valve 5b, there is a bypass that has a branching point 18c, a shut-off valve 7d and a non-return valve 15d, whereby the branching point 18c is connected to the branching point 18b. This bypass makes it possible to operate the evaporator 3 and the external heat exchanger 4 in the heat pump mode of operation in a series connection at the same pressure level. This is especially advantageous for dehumidifying the air at the evaporator 3 when the outdoor temperatures are more than 3° C. [37.4° F.]. A refrigerant flow is only possible from the branching point 18c to the branching point 18b, and from the branching point 18b to the branching point 18a in the described sections of the refrigerant circuit, since the non-return valves preclude another flow direction. A branching point 18d is arranged between the external heat exchanger 4 and the shut-off valve 7, whereby a branch is connected to the shut-off valve 7a via a non-return valve 15f. In the depiction shown in FIG. 9, the refrigerant circuit is operated in a heat pump mode of operation, whereby the shut-off valves 7a and 7b are each brought into a blocked position. In an alternative embodiment, the shut-off valve 7f can also be configured as a non-return valve. The signals or measured values of a p,T sensor 22 for measuring pressure and/or temperature serve to regulate the refrigerant circuit. In another variant (not shown here), the shut-off valve 7d can be configured as an expansion valve, whereby in the heat pump mode of operation, this expansion valve can be used together with the expansion valve 5b, for example, they can be opened together.

FIG. 10 shows a refrigerant circuit that is analogous to FIG. 9 in the cooling system mode of operation, whereby the shut-off valve 7a is blocked and the shut-off valve 7b is open. In this embodiment as well, heat or cold can be conveyed into the refrigerant circuit via the refrigerant heat exchanger 10b.

LIST OF REFERENCE NUMERALS 1 compressor
2 internal heating condenser
3 evaporator
4 external heat exchanger
5a expansion valve
5b expansion valve
5c expansion valve
5d expansion valve
5e expansion valve
6 metering device
7, 7a, 7b, 7c, 7d, 7e, 7f shut-off valve
8a, 8b, 8c, 8d, 8e, 8f switchover valve
9 collector
10, 10a, 10b fluid refrigerant heat exchanger
11 fluid pump
12 heat sink and/or cold sink
13 sound damper
14, 14a branching point
15a, 15b, 15c, 15d, 15e, 15f non-return valve
16, 16a, 16b connection point
17, 17a, 17b branching point
18, 18a, 18b, 18c branching point
19 branching point
20 refrigerant line
21 fluid line
22 p,T sensor
25 fluid line
30 air-conditioning system
40 heat sink and/or cold sink
50 auxiliary heater

The invention claimed is:

1. An air-conditioning system for a vehicle, comprising:
a refrigerant circuit through which a refrigerant can flow and which is configured as a heat pump circuit and as a cooling system circuit, the refrigerant circuit comprising a compressor, at least one external heat exchanger, and at least one internal heat exchanger connected with an internal heating condenser; and
a device for generating an air stream that can be thermally coupled to the internal heat exchanger and to the internal heating condenser, and
a metering device that can meter the flow of at least a partial stream of the thermally coupled air stream through the internal heating condenser; and
a heating mode of operation and a cooling mode of operation, wherein
in the heating mode of operation, the refrigerant can flow from the high-pressure side of the compressor into the internal heating condenser, can flow from the internal heating condenser via a first expansion valve to the internal heat exchanger, can flow from the internal heat exchanger to the external heat exchanger through a second expansion valve through which refrigerant can flow in both directions, and can flow from the external heat exchanger to the low-pressure side of the compressor, wherein the second expansion valve regulates the expansion of refrigerant regardless of which direction the refrigerant flows, and
in the cooling mode of operation, the refrigerant can bypass the first expansion valve while flowing:
from the high-pressure side of the compressor into the internal heating condenser,
from the internal heating condenser to the external heat exchanger,
from the external heat exchanger to the internal heat exchanger via the second expansion valve through which refrigerant can flow in both directions, and
from the internal heat exchanger to the low-pressure side of the compressor.

2. The air-conditioning system according to claim 1, wherein the air-conditioning system is thermally coupled via a first fluid refrigerant heat exchanger to a fluid circuit that comprises at least one heat sink and/or cold sink connected to the first fluid refrigerant heat exchanger on the fluid side.

3. The air-conditioning system according to claim 2, wherein the heat pump circuit as well as the cooling system circuit have a first branching point between the external heat exchanger and the second expansion valve through which refrigerant can flow in both directions, and have a first connection point upstream from the low-pressure side of the compressor,
whereby, in the heating mode of operation and/or in the cooling mode of operation, refrigerant can be conveyed through the first fluid refrigerant heat exchanger from the branching point to the connection point.

4. The air-conditioning system according to claim 3, wherein a third, preferably switchable, expansion valve is arranged between the first branching point and the first fluid refrigerant heat exchanger.

5. The air-conditioning system according to claim 4, wherein, in the heat pump circuit as well as in the cooling system circuit between the first branching point and the first fluid refrigerant heat exchanger, there is a first switchover valve through which refrigerant can flow and by means of which the conveyance of refrigerant to the first fluid refrigerant heat exchanger can be interrupted or permitted through the third expansion valve, or else by means of which the third expansion valve can be bridged.

6. The air-conditioning system according to claim 5, wherein a second switchover valve is provided through which the refrigerant can flow and which is arranged downstream from the external heat exchanger and upstream from the low-pressure side of the compressor in the heat pump circuit, and downstream from the internal heating condenser and upstream from the external heat exchanger in the cooling system circuit.

7. The air-conditioning system according to claim 1, characterized in that a shut-off valve is provided through which refrigerant can flow and which is arranged downstream from the internal heat exchanger and upstream from the low-pressure side of the compressor in the cooling system circuit.

8. The air-conditioning system according to claim 1, wherein the air-conditioning system is thermally coupled via a second fluid refrigerant heat exchanger to a second fluid circuit that comprises at least one heat sink and/or cold sink connected to the fluid refrigerant heat exchanger on the fluid side.

9. The air-conditioning system according to claim 8, wherein the heat pump circuit as well as the cooling system circuit have at least a second branching point between the internal heat exchanger and the expansion valve through which refrigerant can flow in both directions, and have a first connection point and at least a second connection point upstream from the low-pressure side of the compressor, whereby, in the heating mode of operation and/or in the cooling system mode of operation, refrigerant can be conveyed through the first fluid refrigerant heat exchanger from the at least second branching point to the first connection point, and through the second fluid refrigerant heat exchanger from the at least second branching point to the at least second connection point.

10. The air-conditioning system according to claim 1, wherein the heat pump circuit as well as the cooling system circuit have a third branching point between the internal heating condenser and the first expansion valve, and have a third connection point upstream from the low-pressure side of the compressor, whereby a third fluid refrigerant heat exchanger is arranged between the third branching point and the third connection point, and, in the heating mode of operation and/or in the cooling mode of operation, refrigerant can be conveyed from the third branching point to the third connection point through the third fluid refrigerant heat exchanger.

11. The air-conditioning system according to claim 1, wherein, in the first and/or second fluid circuit(s), there is an auxiliary heater by means of which heat can be conveyed into the cooling system circuit.

12. The air-conditioning system according to claim 1, wherein in the heating mode of operation as well as in the cooling mode of operation, the refrigerant is conveyed from the high-pressure side of the compressor into the internal heating condenser.

13. The air-conditioning system according to claim 1, wherein refrigerant flows through the first expansion valve during the heating mode of operation, whereas refrigerant does not flow through the first expansion valve in the cooling mode of operation.

14. The air-conditioning system according to claim 1, wherein in case of an iced-over external heat exchanger, heated refrigerant, after flowing through the internal heating condenser, is conveyed directly to the external heat exchanger for defrosting purposes.

15. The air-conditioning system according to claim 1, wherein the internal heat exchanger is configured as an evaporator; and the external heat exchanger is configured as one of a condenser, a gas cooler, and an evaporator.

16. The air-conditioning system according to claim 1, wherein the metering device is configured as a temperature-control flap by means of which an air stream that strikes the internal heating condenser can be deflected or interrupted.

17. The air-conditioning system according to claim 1, wherein all expansion valves are configured as one of a thermostatic expansion valve and an electronic expansion valve.

18. The air-conditioning system according to claim 1, wherein at least 7.5% of the air mass flow of the thermally coupled air stream flows through the internal heating condenser, so that the temperature of a passenger compartment can be raised.

19. The air-conditioning system according to claim 1, wherein at most 2.5% of the air mass flow of the thermally coupled air stream flows through the internal heating condenser, and thus cooled air is conveyed directly into a passenger compartment through the internal heat exchanger, without being substantially heated up by the internal heating condenser.

20. The air-conditioning system according to claim 1, wherein at least 2.5% of the air mass flow of the thermally coupled air stream flows through the internal heating condenser, so that air that has been cooled and dried by the internal heat exchanger is heated up on the internal heating condenser.

21. The air-conditioning system according to claim 1, wherein the internal heat exchanger is an evaporator.

* * * * *